(12) United States Patent
Robins

(10) Patent No.: US 8,162,189 B2
(45) Date of Patent: Apr. 24, 2012

(54) AUTOMOBILE ACCESSORY AND METHOD

(76) Inventor: Daniel Robins, West Chester, PA (US)

( * ) Notice: Subject to any disclaimer, the term of this patent is extended or adjusted under 35 U.S.C. 154(b) by 454 days.

(21) Appl. No.: 12/509,097

(22) Filed: Jul. 24, 2009

(65) Prior Publication Data
US 2011/0017790 A1    Jan. 27, 2011

(51) Int. Cl.
B60R 7/04 (2006.01)
A47D 15/00 (2006.01)
(52) U.S. Cl. ........ 224/275; 224/542; 224/556; 224/928; 224/901.8; 297/182
(58) Field of Classification Search ................. 224/275, 224/542, 928, 556, 901.8; 297/182; 296/37.8, 296/37.15, 37.16
See application file for complete search history.

(56) References Cited

U.S. PATENT DOCUMENTS

| | | | |
|---|---|---|---|
| 2,283,069 A | 5/1942 | Knuetter | |
| 2,771,127 A * | 11/1956 | Cole | 297/182 |
| 3,014,759 A | 12/1961 | Bing | |
| 3,165,247 A * | 1/1965 | Burns | 224/275 |
| 3,632,029 A * | 1/1972 | Sonner | 224/275 |
| 4,141,399 A | 2/1979 | Zoland | |
| 4,596,416 A | 6/1986 | Muller | |
| 4,619,477 A | 10/1986 | Kneib et al. | |
| 4,844,311 A | 7/1989 | Kalen | |
| 4,898,477 A | 2/1990 | Cox et al. | |
| 4,948,195 A * | 8/1990 | Saunders | 297/182 |
| D318,549 S | 7/1991 | Delmerico | |
| 5,044,774 A | 9/1991 | Bullard et al. | |
| 5,064,069 A | 11/1991 | Su | |
| 5,226,576 A | 7/1993 | Ellsworth | |
| 5,316,368 A | 5/1994 | Arbisi et al. | |
| 5,356,061 A | 10/1994 | Yu | |
| 5,383,727 A * | 1/1995 | Rife | 383/11 |
| 5,518,309 A * | 5/1996 | St-Pierre | 312/140.4 |
| 5,535,571 A | 7/1996 | Nichols et al. | |
| 5,800,005 A | 9/1998 | Arold et al. | |
| 5,868,294 A | 2/1999 | Webster | |
| 5,894,973 A * | 4/1999 | Stone | 224/275 |
| 6,022,072 A * | 2/2000 | Moyer | 297/182 |
| 6,116,672 A | 9/2000 | Cannon et al. | |
| 6,550,654 B1 * | 4/2003 | Crago | 224/275 |
| 6,626,337 B1 * | 9/2003 | Cox | 224/275 |
| D494,534 S | 8/2004 | Hasset | |
| 6,880,874 B1 | 4/2005 | Kallenberger et al. | |
| 6,899,460 B2 | 5/2005 | Turvey et al. | |
| 6,971,698 B1 | 12/2005 | King | |
| D519,915 S | 5/2006 | Eskandry | |
| D533,325 S * | 12/2006 | Bird | D34/1 |
| D539,037 S | 3/2007 | Bergh et al. | |
| 7,207,626 B2 | 4/2007 | Hasset | |
| 7,527,314 B2 * | 5/2009 | Dohan | 296/37.8 |
| 7,736,711 B2 * | 6/2010 | Dobelle | 428/34.1 |
| 7,758,090 B2 * | 7/2010 | Gregory | 296/1.07 |
| 8,056,970 B1 * | 11/2011 | Phillips | 297/182 |
| 2003/0122392 A1 | 7/2003 | Larsen et al. | |

(Continued)

Primary Examiner — Justin Larson
(74) Attorney, Agent, or Firm — Gerry J. Elman; Elman Technology Law, P.C.

(57) ABSTRACT

Multiple embodiments of an automobile accessory comprising an envelope that fits between the center console of an automobile and either the front driver's seat, or the front passenger's seat, for catching items that would otherwise end up between an automobile seat and the center console or under the seat. In addition, the accessory may act as a convenient storage location for items intentionally placed inside it. Also included are methods of using embodiments of the automobile accessory.

7 Claims, 6 Drawing Sheets

U.S. PATENT DOCUMENTS

| | | | |
|---|---|---|---|
| 2005/0218170 A1* | 10/2005 | Allmond | 224/542 |
| 2005/0279793 A1* | 12/2005 | Mulvihill | 224/542 |
| 2006/0226152 A1 | 10/2006 | Barber | |
| 2007/0235483 A1* | 10/2007 | Konet | 224/275 |
| 2007/0241581 A1* | 10/2007 | Martin | 296/37.8 |
| 2008/0231063 A1 | 9/2008 | Bowers | |
| 2008/0272166 A1* | 11/2008 | Frank et al. | 224/544 |
| 2008/0283565 A1* | 11/2008 | Simon et al. | 224/542 |
| 2009/0001749 A1 | 1/2009 | Johnson et al. | |
| 2009/0134688 A1* | 5/2009 | Waltman et al. | 297/463.2 |
| 2010/0231010 A1* | 9/2010 | Manley | 297/182 |
| 2011/0266820 A1* | 11/2011 | Hurwitz | 296/1.07 |

* cited by examiner

AUTOMOBILE ACCESSORY AND METHOD

FIELD OF THE INVENTION

The present invention pertains to automobile accessories. More particularly, the present invention relates to an envelope that fits between the center console of an automobile and either the front driver's seat, or the front passenger's seat, for catching items that would otherwise end up between an automobile seat and the center console or under the seat. In addition, the envelope may act as a convenient storage location for items intentionally placed inside it.

SUMMARY OF THE INVENTION

The present invention involves multiple embodiments of an automobile accessory for catching items that would otherwise fall between an automobile seat and the center console or under the seat. In addition, the invention includes methods of using the accessory.

The following description of the accessory begins at a high level of generality and increases in detail to define various embodiments. At the most basic level, the accessory comprises an envelope that fits between the center console of an automobile and either the front driver's seat, or the front passenger's seat. Within the context of this specification, the term "envelope" shall mean a pouch-like holder or sleeve with an open top, and not specifically a flat paper container with a gummed flap commonly used to send mail. The envelope opens at the top, with a width of roughly 1.5 inches. In some embodiments, the sides of the envelope flange outward at the top. The width of the envelope tapers down to approximately 0.5 inches at its base. The envelope is about 11.5 inches long, to accommodate an 8.5×11-inch document oriented horizontally in the envelope. One embodiment, targeted at small to mid-sized automobiles, is about 3 inches in height. Another embodiment, intended to be used in sport utility vehicles or trucks, is about 5 inches in height. While the aforementioned heights correspond to preferred embodiments, other embodiments could be of different heights such as between 2 and 10 inches.

While the width of the envelope has been specified above, the envelope is actually somewhat compressible to allow it to be squeezed into place between the center console and seat. The envelope offers a measure of resistance against compression due to the material that the envelope is made of and/or because of one or more shape-retaining members incorporated into the envelope. The shape-retaining member is a bent strip of metal, plastic, or other resilient material that is a) sandwiched between an inner and outer layer of envelope material, b) affixed to the inside of the envelope, and/or c) affixed to the outside of the envelope. In addition, there is a strip of adhesive tape having the hook component of hook-and-loop adhesive tape (e.g. VELCRO®) on the side of the envelope that abuts the center console. The small hooks on the adhesive tape engage with the carpeted surface found on most center consoles, or with a strip of adhesive tape having the corresponding loops. The self-expanding property of the envelope and the strip of tape with small hooks allow the envelope to be securely situated into place between the seat and console. The material of the envelope is vinyl, plastic, rubber, or another material that is flexible, resilient, and dishwasher-safe.

In some embodiments, the envelope includes an L-shaped or, preferably, a U-shaped extension that fits around the end of a center console that faces the rear of an automobile. The extension is preferably made of a rigid material such as hard plastic, metal, or wood. The extension is advantageous in that it provides additional security against the envelope becoming displaced in the event of a sudden stop. The extension could be incorporated with the material of the envelope as a single unit or affixed to the envelope with glue, tape, staples, tacks, screws, nails, or other suitable attachment means. Another provision for ensuring that the envelope stays in place even when sudden forces act upon the envelope is one or more hooks that connect the envelope to an adjacent surface inside the automobile. Such a hook is of rigid material, such as metal or hard plastic and is located anywhere along the sides of the envelope. Each hook is either integral to the material of the envelope or affixed to the envelope with glue, tape, staples, tacks, screws, nails, or other suitable attachment means. Instead of a separate means for attaching a hook to the envelope, a hook itself could include attachment means for both the envelope and the surface of the automobile. Included in the scope of this description is a double-ended hook that includes a first hook at a proximal end to engage with the material of the envelope and a second hook at a distal end to engage with a surface inside an automobile. Surfaces inside the automobile that a hook could engage with include the outside of a center console, a floor mat, a floor board, and the outside of a seat.

In addition to the accessory itself, there are methods of using the accessory. At its most basic, a method of using the accessory is: 1) orienting the envelope above a space between a center console of an automobile and either a driver's seat or a front passenger's seat, with the side of the envelope with the adhesive tape facing towards the center console; 2) compressing the envelope to reduce its width to less than the width of the space; 3) inserting the envelope into the space; and 4) releasing compression on the envelope, allowing it to expand. After one or more items have collected inside the envelope, the user would either remove the envelope entirely and dump the contents out, or retrieve the items with the envelope still mounted between the seat and center console. It should be noted that items may collect in the envelope not only when they inadvertently fall into it, but also when they are intentionally placed there by a person. Another method for use with certain embodiments of the accessory includes the additional step of positioning an extension of the envelope to wrap around the end of a center console facing the rear of an automobile. Yet another method for use with certain embodiments of the accessory includes engaging one or more hooks with a side of the envelope and an adjacent surface inside an automobile.

In one aspect, the present invention provides an automobile accessory comprising:

an envelope of dishwasher-safe, resilient, flexible material having a length of approximately 11.5 inches and having a substantially V-shaped cross-section with an open top having a width of approximately 1.5 inches, a base having a width of approximately 0.5 inches, a proximal side, a distal side, a left side, and a right side; said envelope having a height of approximately 3 to 5 inches; and a strip of adhesive tape having small hooks, said strip adhered to either the left side or the right side of the envelope with said hooks pointing away from the envelope.

In another aspect, the present invention further provides an automobile accessory as previously described wherein an uppermost section of said open top flanges laterally outward.

In another aspect, the present invention further provides an automobile accessory as previously described wherein the material of the envelope is plastic.

In another aspect, the present invention further provides an automobile accessory as previously described wherein the material of the envelope is vinyl.

In another aspect, the present invention further provides an automobile accessory as previously described wherein the material of the envelope is rubber.

In another aspect, the present invention further provides an automobile accessory as previously described wherein the strip of adhesive tape is between 1 and 1.5 inches in height, is approximately the same length as the envelope, and is located at a lowermost section of either the left side or the right side of the envelope.

In another aspect, the present invention further provides an automobile accessory as previously described further comprising a shape-retaining member comprising a bent strip of resilient material that is sandwiched between an inner and outer layer of envelope material, affixed to the inside of the envelope, or affixed to the outside of the envelope.

In another aspect, the present invention further provides an automobile accessory as previously described wherein the envelope has a height of approximately 3 inches.

In another aspect, the present invention further provides an automobile accessory as previously described wherein the envelope has a height of approximately 5 inches.

In another aspect, the present invention further provides an automobile accessory as previously described further comprising at least one hook of rigid material connected to a side of the envelope.

In another aspect, the present invention further provides an automobile accessory as previously described wherein the material of the at least one hook is metal or plastic.

In another aspect, the present invention further provides an automobile accessory as previously described wherein the at least one hook is a double-ended hook including a first hook at a proximal end engaged with the material of the envelope and a second hook at a distal end.

In another aspect, the present invention further provides an automobile accessory as previously described further comprising an L-shaped or U-shaped extension of rigid material connected to the left side, the right side, or the proximal side of the envelope and projecting longitudinally outward from the envelope.

In another aspect, the present invention further provides an automobile accessory as previously described wherein the material of the extension is plastic, metal, or wood.

In another aspect, the present invention further provides an automobile accessory as previously described wherein the extension is U-shaped.

In another aspect, the present invention provides a method of using an automobile accessory comprising:

an envelope of dishwasher-safe, resilient, flexible material having a length of approximately 11.5 inches and having a substantially V-shaped cross-section with an open top having a width of approximately 1.5 inches, a base having a width of approximately 0.5 inches, a proximal side, a distal side, a left side, and a right side; and a strip of adhesive tape having small hooks, said strip adhered to either the left side or the right side of the envelope with said hooks pointing away from the envelope, the method comprising:

a) orienting the envelope above a space having a width between a center console of an automobile and either a driver's seat or a front passenger's seat, with the side of the envelope with the adhesive tape facing towards the center console;

b) if the envelope is wider than the space, compressing the envelope to reduce the width of the envelope to less than the width of the space;

c) inserting the envelope into the space; and d) releasing any compression on the envelope.

In another aspect, the present invention provides a method of using an automobile accessory, as previously described, further comprising:

e) after one or more items have collected inside the envelope, retrieving one or more of the items with the envelope still situated between a seat and the center console.

In another aspect, the present invention provides a method of using an automobile accessory, as previously described, further comprising:

e) with an L-shaped or U-shaped extension of rigid material which is connected to the left side, the right side, or the proximal side of the envelope and projects longitudinally outward from the envelope, positioning said extension such that it wraps around an end of a center console facing the rear of the automobile.

In another aspect, the present invention provides a method of using an automobile accessory, as previously described, further comprising:

e) engaging at least one hook of rigid material connected to a side of the envelope with an adjacent surface inside the automobile.

In another aspect, the present invention provides a method of using an automobile accessory, as previously described, further comprising:

e) after one or more items have collected inside the envelope, removing the envelope from the space; and f) dumping the items out of the envelope.

These and other aspects of the present invention will become readily apparent from the following detailed description taken in conjunction with the accompanying drawings.

DETAILED DESCRIPTION

Figure 1:
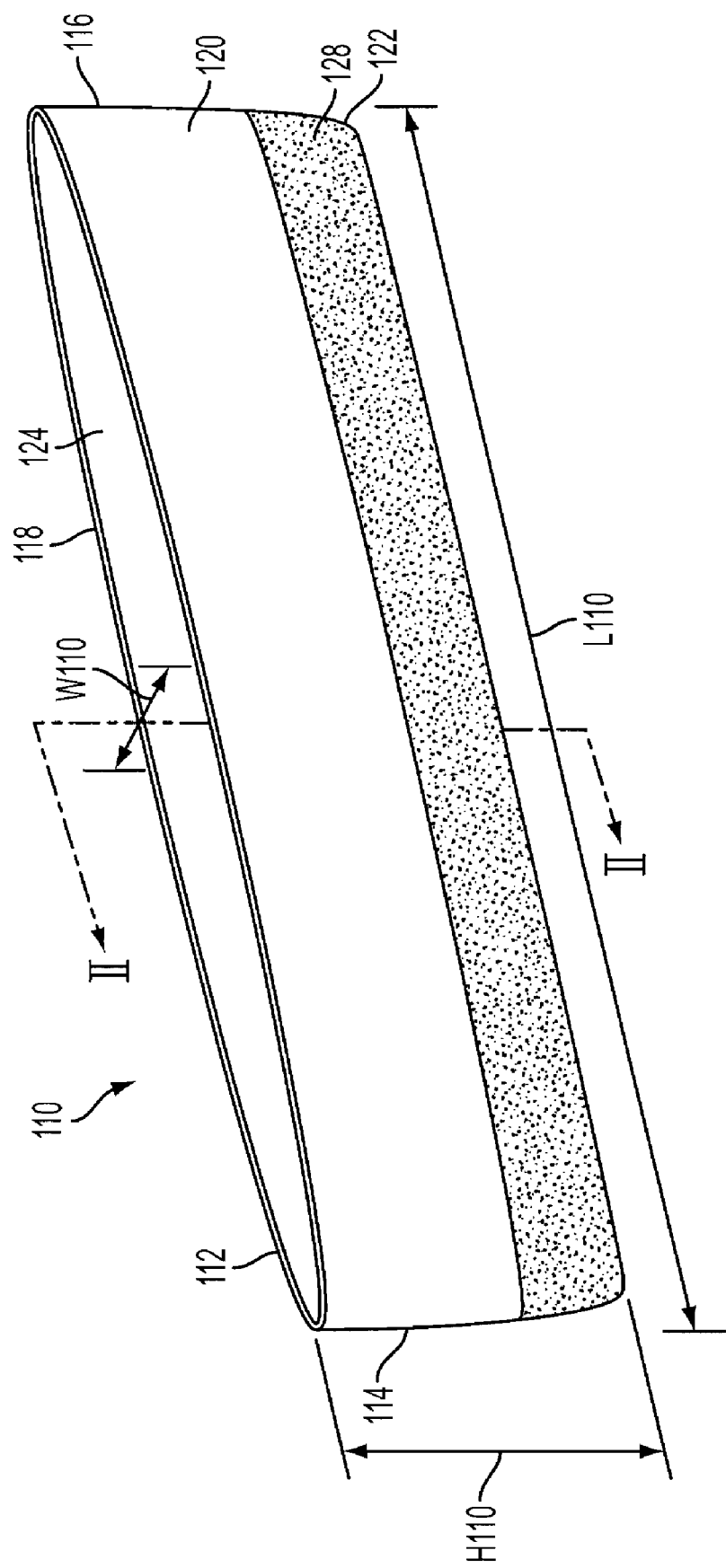
FIG. 1 is a perspective view of an automobile accessory of the present invention.

FIG. 1 is a perspective view of an automobile accessory of the present invention 110. The accessory 110 includes an envelope 112, having a proximal side 114, a distal side 116, a left side 118, a right side 120, a base 122, and an open top 124. Along the bottom of the right side 120 is a strip of adhesive tape with small hooks (hereinafter "hook-tape") 128. The strip of hook-tape 128 can engage with the carpeted surface often found on the sides of a center console in an automobile.

If a particular automobile does not have a carpeted surface on the sides of the center console, a piece of adhesive tape with minute loops or pile (hereinafter "loop-tape") could be adhered to the center console for engagement with the hook-tape 128.

In other embodiments of the invention, either single- or double-sided tape could be used to secure the envelope to a surface of the center console.

The accessory 110 shown in FIG. 1 is intended for use with small to mid-sized automobiles. As a result, certain dimensions of the envelope 112 differ from an embodiment intended for use in large automobiles, such as trucks and/or sport utility vehicles. In this embodiment, dimension H110 is approximately 3 inches. In an alternate embodiment designed for use in a large automobile, the same dimension would be approximately 5 inches. The envelope is intended to rest on the floorboard of the automobile. Larger automobiles can accommodate larger heights for the envelope, resulting in more storage capacity. The dimension L110 is approximately 11.5 inches and the dimension W110 is about 1.5 inches.

Figure 2:
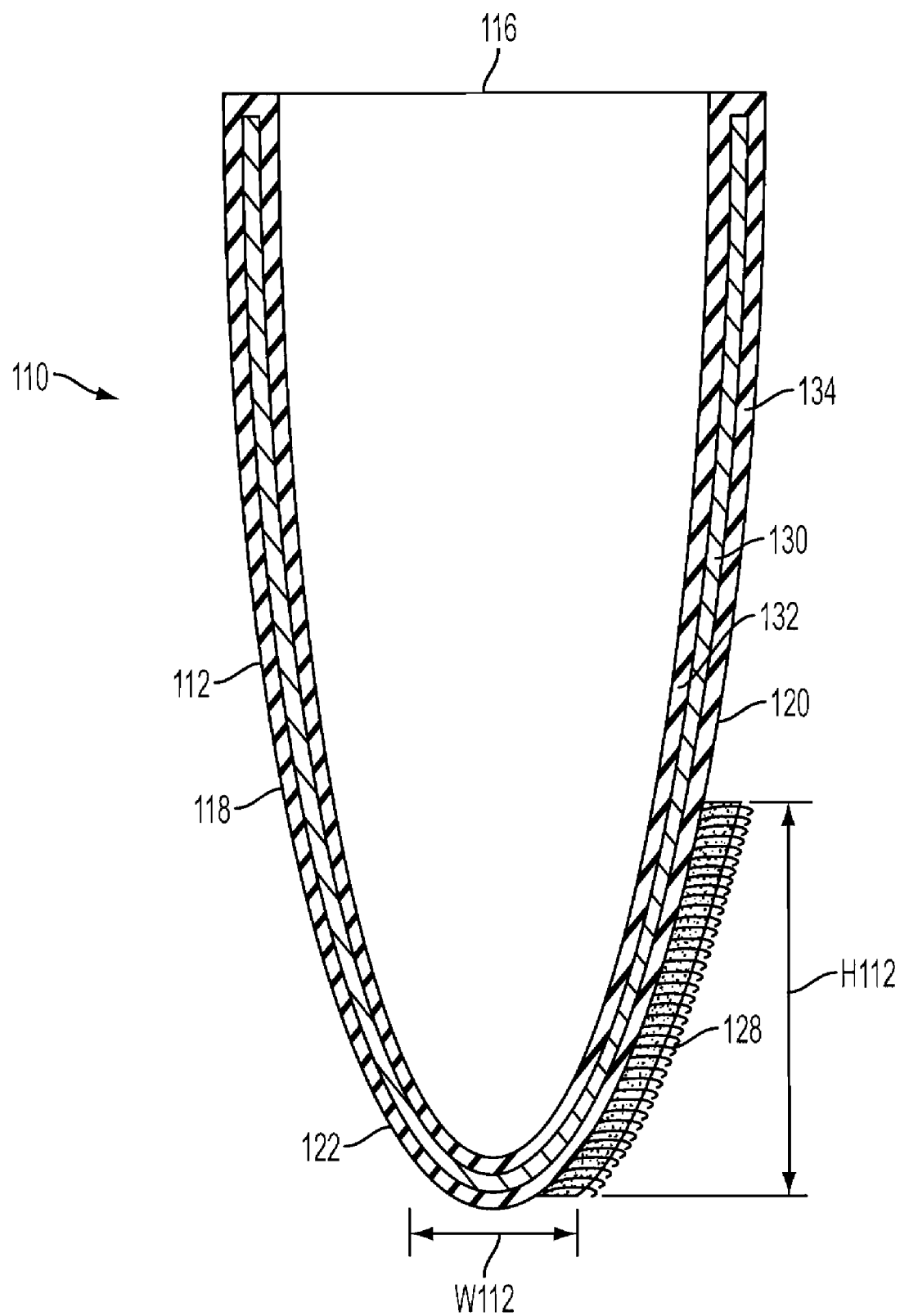
FIG. 2 is a cross-sectional view of the automobile accessory of FIG. 1.

FIG. 2 is a cross-sectional view of the automobile accessory 110 of FIG. 1, taken along line II. Visible here are the left side 118, the right side 120, and the base 122 of the envelope 112. Also visible in FIG. 2 is the distal side 116 of the envelope 112. Sandwiched between an inner layer 132 and outer layer 134 of the material of the envelope 112 is a shape-retaining member 130, comprising a strip of metal bent to match the cross-sectional shape of the envelope 112 as shown in FIG. 2. The shape-retaining member 130 allows the envelope 112 to be compressed when a reasonable amount of compressive force is applied by hand, but is resilient enough to cause the envelope 112 to expand back to its original shape when the compressive force is released. In other embodiments, the shape-retaining member may be affixed to the inside the envelope, affixed to the outside of the envelope, or entirely absent. A shape-retaining member in other embodiments could be oriented differently than in FIG. 2. For instance, a shape-retaining member could be oriented at a degree of rotation along an axis running horizontally through the cross-sectional view shown in FIG. 2, or in other words, a transverse axis. Other embodiments may have multiple shape-retaining members. In embodiments that have no shape-retaining member, the material of the envelope is resilient enough to allow compression and re-expansion without the aid of a shape-retaining member.

Also visible in FIG. 2 is width of the base 122, denoted as W112. The W112 dimension is approximately 0.5 inches. Regardless of whether an automobile accessory of the present invention is designed for a small to mid-sized automobile, or a large automobile, the base would be approximately 0.5 inches in width. Along the bottom of the right side 120 is a strip of hook-tape 128. It has a height, denoted as H112, of about 1 inch. Generally speaking, the height of the strip of hook-tape would range from approximately 1 inch to 1.5 inches, with the height being on the lower end of the spectrum for small to mid-sized automobiles and on the higher end for large automobiles.

Figure 3:
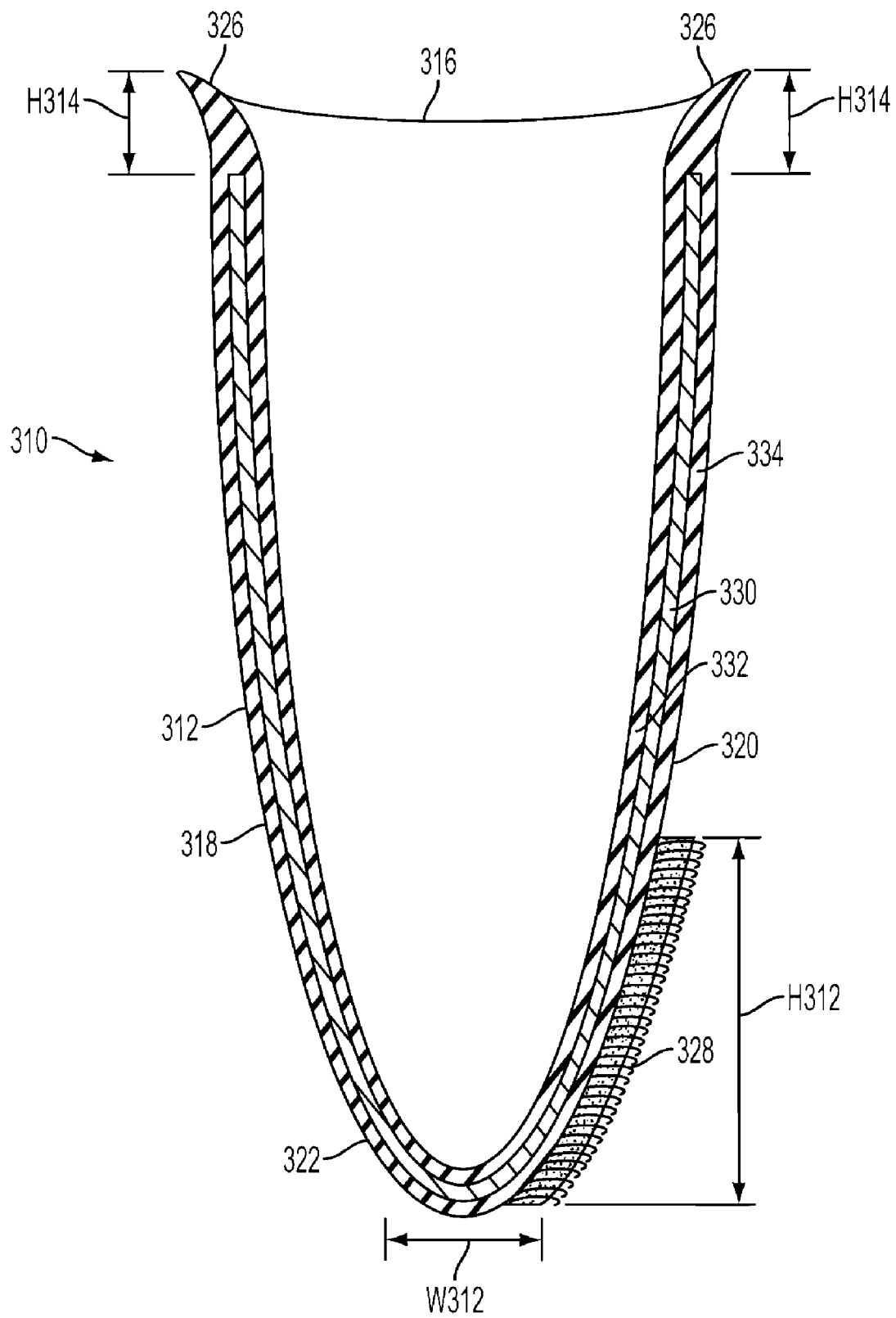
FIG. 3 is a cross-sectional view of an alternate embodiment of the automobile accessory wherein the uppermost section of the open top flanges laterally outward.

FIG. 3 is a cross-sectional view of an alternate embodiment of an automobile accessory 310, wherein the view is taken along the same cross-sectional line that FIG. 2 is taken along. In the uppermost 0.125 inch section, denoted as dimension H314, the left side 318 and the right side 320 of the envelope 312 have flanges 326 that extend laterally outward. Also visible in FIG. 3 is the distal side 316 of the envelope 312. Sandwiched between an inner layer 332 and outer layer 334 of the material of the envelope 312 is a shape-retaining member 330, comprising a strip of metal bent to match the cross-sectional shape of the envelope 312 as shown in FIG. 3. Similar to shape-retaining member shown in FIG. 2, shape-retaining member 330 allows the envelope 312 to be compressed when a reasonable amount of compressive force is applied by hand, but is resilient enough to cause the envelope 312 to expand back to its original shape when the compressive force is released.

Also visible in FIG. 3 is the width of the base, denoted as W312. As in the embodiment shown in FIG. 2, the W312 dimension here is approximately 0.5 inches. Along the bottom of the right side 320 is a strip of hook-tape 328. It has a height, denoted as H312, of about 1 inch. In other embodiments, the height of the hook-tape could range between about 1 inch and about 1.5 inches.

Figure 4:
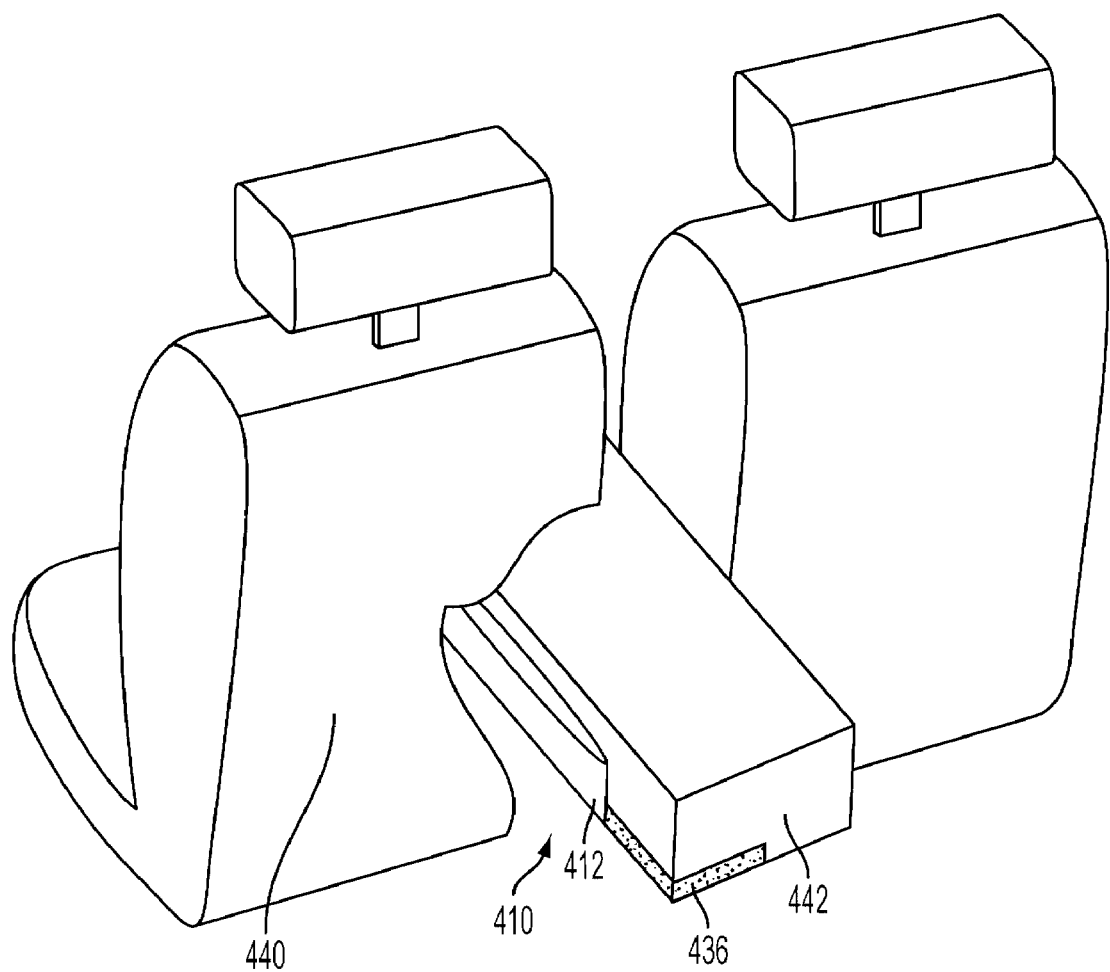
FIG. 4 is a perspective, partial cutaway view showing an automobile accessory having an L-shaped extension fitting around the back of a center console of an automobile.

FIG. 4 is a perspective, partial cutaway view showing an automobile accessory 410 having an L-shaped extension 436 fitting around the back of a center console 442 of an automobile. Automobile seat 440 is partially cut away to show the position of the automobile accessory 410. As a precautionary measure to guard against displacement of the accessory 410 due to sudden braking, L-shaped extension 436 extends from the envelope 412 and wraps around the back of center console 442. The L-shaped extension 436 in this particular embodiment is affixed to the right side of the envelope 412 with glue. It is emphasized that the extension 436 could also be incorporated with the material of the envelope 412 as a single unit or affixed to the envelope 412 with tape, staples, tacks, screws, nails, or other suitable attachment means. The L-shaped extension 436 in FIG. 3 is made of hard plastic. Other materials may be used in alternate embodiments, but it is preferred that the material be rigid.

Figure 5:
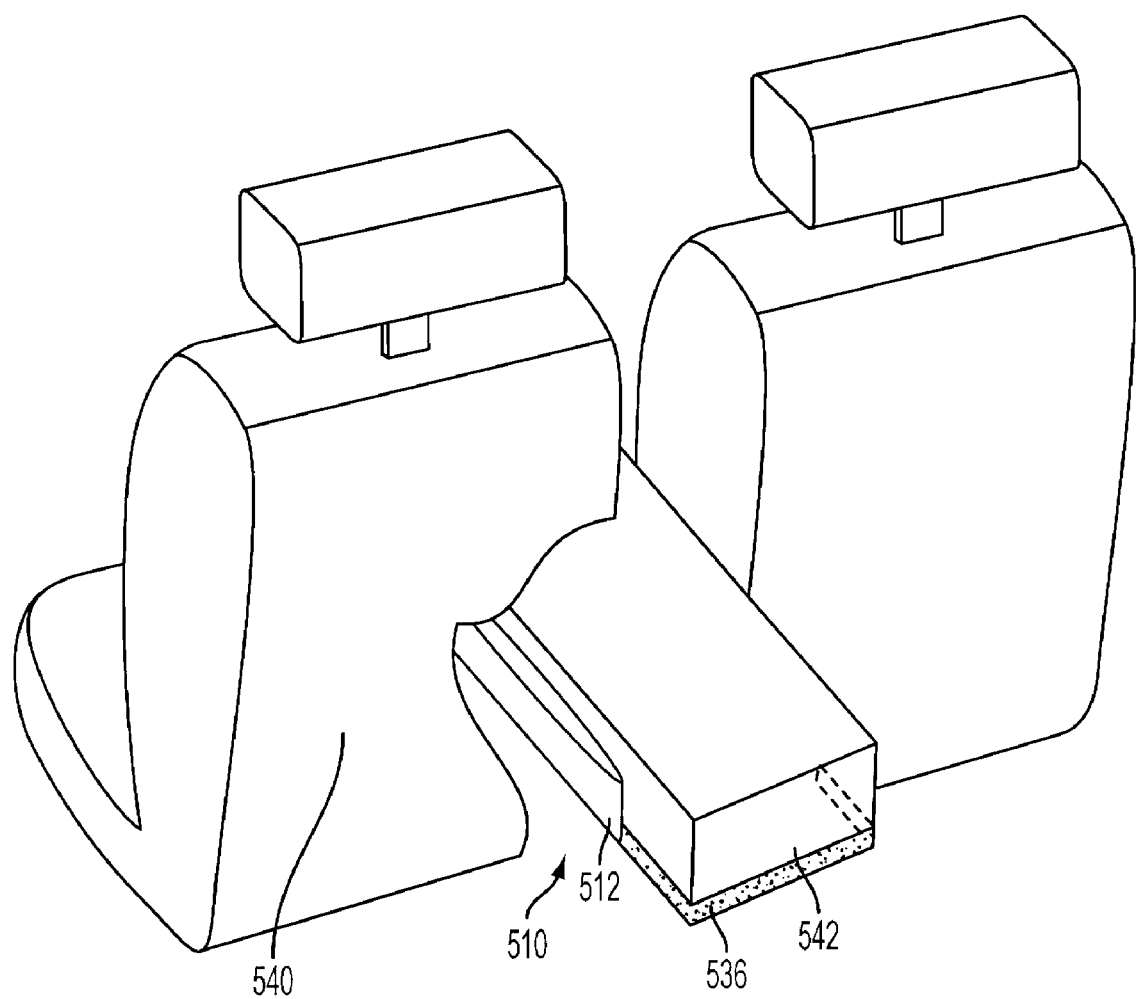
FIG. 5 is a perspective, partial cutaway view showing an automobile accessory having a U-shaped extension fitting around the back and sides of a center console of an automobile.

FIG. 5 is a perspective, partial cutaway view showing an automobile accessory 510 having a U-shaped extension 536 fitting around the back and sides of a center console 542 of an automobile. Automobile seat 540 is partially cut away to show the position of the automobile accessory 510. As a precautionary measure to guard against displacement of the accessory 510 due to sudden braking and/or lateral forces, U-shaped extension 536 extends from the envelope 512 and wraps around the back and sides of center console 542. An advantage of a U-shaped extension over an L-shaped extension is the added protection against potential lateral forces against either side of the accessory 510. A potential downside to the U-shaped extension is that, in order to be effective in protecting against lateral forces, it would need to fit the width of the center console 542. While various configurations of the U-shaped extension could be manufactured to fit center consoles of different widths, an L-shaped extension would be more likely to fit any given center console. The U-shaped extension 536 in this particular embodiment is affixed to the right side of the envelope 512 with staples. It is emphasized that the extension 536 could also be incorporated with the material of the envelope 512 as a single unit or affixed to the envelope 512 with glue, tape, tacks, screws, nails, or other suitable attachment means. The U-shaped extension 536 is made of metal in this embodiment. As with the L-shaped extension discussed previously, other materials may be used in alternate embodiments of the U-shaped extension, but rigid materials are preferred.

Figure 6:
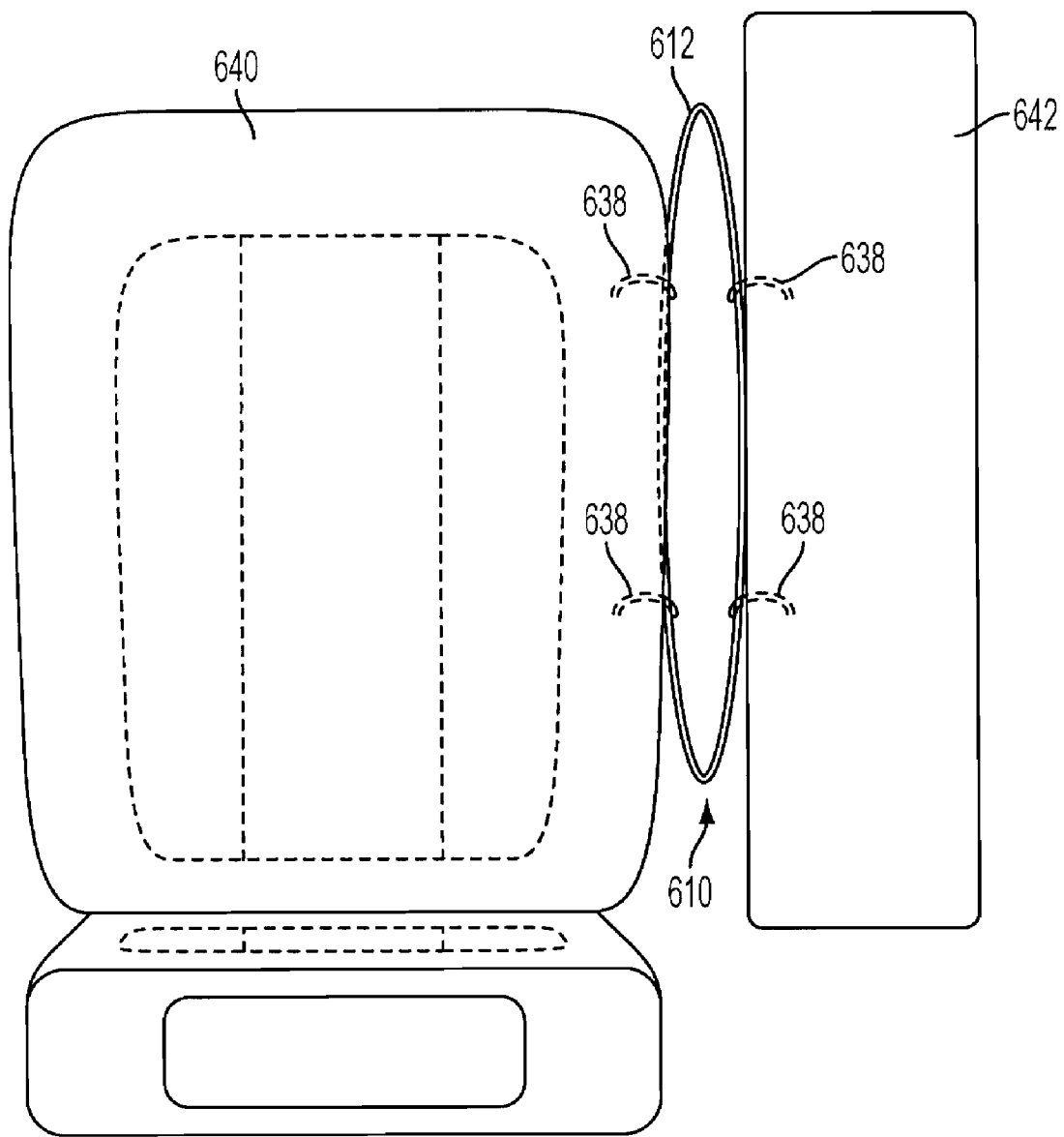
FIG. 6 is a plan view showing an automobile accessory having double-ended hooks engaging with the material of the envelope and the surface of an automobile seat and a center console.

FIG. 6 is a plan view showing an automobile accessory 610 having double-ended hooks 638, engaging with the material of the envelope 612, the right side of automobile seat 640, and the left side of center console 642. The hooks 638 are shown in phantom at the portions that are embedded in the material of the seat 640, center console 642, and envelope 612. Hooks 638 act as a restraining means to counteract forces that might otherwise displace the accessory 610. The double-ended hooks 638 shown in FIG. 6, and hooks in general, provide for a more permanent and secure mounting of the accessory 610 than other embodiments discussed previously. A tradeoff of this configuration is that more effort would be required to remove the accessory 610 from between the seat 640 and center console 642 and dump its contents out, compared to previously-described embodiments. Additionally, repeatedly hooking and unhooking the accessory 610 from the automobile seat 640 and center console 642 could be deleterious to their surfaces. For these reasons, a suggested method of emptying the contents would be by reaching into the envelope 612 and removing the contents by hand, with the envelope 612 still hooked into place.

The above-described embodiments are intended to illustrate the principles of the invention, but not to limit its scope. Other embodiments and variations will be apparent to those skilled in the art and may be made without departing from the spirit and scope of the invention.

I claim:

1. A method for using an automobile accessory comprising:
    an envelope of dishwasher-safe, resilient, flexible material having a substantially V-shaped cross-section with an open top, a base, a proximal side, a distal side, a left side, and a right side;
    a strip of adhesive tape having small hooks, said strip adhered to either the left side or the right side of the envelope with said hooks pointing away from the envelope; and
    an L-shaped or U-shaped extension of rigid material which is connected to the left side, the right side, or the proximal side of the envelope and projects longitudinally outward from the envelope;
    the method comprising:
    a) orienting the envelope above a space having a width between a center console of an automobile and either a driver's seat or a front passenger's seat, with the side of the envelope with the adhesive tape facing towards the center console;
    b) if the envelope is wider than the space, compressing the envelope to reduce the width of the envelope to less than the width of the space;
    c) inserting the envelope into the space;
    d) releasing any compression on the envelope; and
    e) positioning said extension such that it wraps around an end of a center console facing the rear of the automobile.

2. The method of claim 1, wherein the envelope has a length of approximately 11.5 inches, the open top has a width of approximately 1.5 inches, and the base has a width of approximately 0.5 inches.

3. The method of claim 1, wherein the automobile accessory further comprises an uppermost section of said open top flanging laterally outward.

4. The method of claim 1, wherein the automobile accessory further comprises a shape-retaining member comprising a bent strip of resilient material that is sandwiched between an inner and outer layer of envelope material, affixed to the inside of the envelope, or affixed to the outside of the envelope.

5. The method of claim 1, further comprising:
    f) after one or more items have collected inside the envelope, removing the envelope from the space; and
    g) dumping the items out of the envelope.

6. The method of claim 1, further comprising:
    f) after one or more items have collected inside the envelope, retrieving one or more of the items with the envelope still situated between a seat and the center console.

7. The method of claim 1, further comprising:
    f) engaging at least one hook of rigid material connected to a side of the envelope with an adjacent surface inside the automobile.

* * * * *